United States Patent

Lampersberger et al.

[11] Patent Number: 6,018,385
[45] Date of Patent: Jan. 25, 2000

[54] MEASURING SYSTEM FOR REGISTERING REFLECTANCES ON PRINTED PRODUCTS

[75] Inventors: Franz Lampersberger, Aschheim; Peter Rakitsch, Moosburg; Rainer Tutsch; Hans Joachim Six, both of Munich; Karsten Wendt, Obertshausen, all of Germany

[73] Assignee: MAN Roland Druckmaschinen AG, Germany

[21] Appl. No.: 09/200,908

[22] Filed: Nov. 27, 1998

[30] Foreign Application Priority Data

Nov. 29, 1997 [DE] Germany ............... 297 21 199 U

[51] Int. Cl.[7] ............... G01J 3/50; G01N 21/25
[52] U.S. Cl. ............... 356/73; 356/402; 356/407
[58] Field of Search ............... 356/73, 402, 405, 356/406, 407, 425, 319, 326, 328

[56] References Cited

U.S. PATENT DOCUMENTS

| 4,806,002 | 2/1989 | Simeth et al. | 356/445 |
| 5,141,323 | 8/1992 | Kipphan et al. | 356/406 |
| 5,182,721 | 1/1993 | Kipphan et al. | 356/407 |

FOREIGN PATENT DOCUMENTS

| 0 370 126 B1 | 9/1996 | European Pat. Off. . |
| 19530185 | 5/1996 | Germany . |

Primary Examiner—F. L. Evans
Attorney, Agent, or Firm—Leydig, Voit & Mayer, Ltd.

[57] ABSTRACT

A measuring system for registering reflectances on printed products, the measuring system having at least one illumination channel for producing a scanning spot at a point on a measurement field on the printed material. The system includes scanning channels for registering the reflectances of the spot from the printed material. The measuring system moves relative to the printed material. Measuring devices supplying ink density and spectral, preferably colorimetric, measured values are combined with one another without additional outlay in terms of construction. The combination of the measuring principles (density and color) are optimally adapted to the task of a measuring strips on the printed material scanned in the longitudinal direction. The measuring system has a densitometer that produces a scanning spot on the printed material, and a spectrophotometer that produces a further scanning spot on the printed material. The densitometer and the spectrophotometer are arranged one behind the other in the measuring head. The scanning spot of the densitometer and the scanning spot of the spectrophotometer are spaced apart from each other by a distance determined by the speed of the measuring system in the scanning direction and by the computational speed of the evaluation electronics, which are connected downstream of the densitometer and the spectrophotometer. The measured values from the densitometer may trigger the measurements and/or evaluations of the measured values obtained by the spectrophotometer.

5 Claims, 4 Drawing Sheets

MEASURING SYSTEM FOR REGISTERING REFLECTANCES ON PRINTED PRODUCTS

TECHNICAL FIELD

The invention is directed to controlling the printing process in a printing machine and, more particularly to measuring the quality of the printed image.

BACKGROUND

In order to control the printing process, and for the quality analysis of printed products, it is known to print, alongside the actual subject, measurement fields, which can be scanned by means of measuring instruments. For this purpose measurement fields are preferably combined, at least section by section, to form measurement strips, that is to say the individual measurement fields are lined up to form a strip. For the purpose of monitoring offset printed products, use is mostly made of densitometers, in which the reflectances of the measurement fields are registered by filter or measurement channels configured to be complementary to the printing inks, and are converted to an ink density value by means of taking logarithms. The particular advantage of ink density measurement is the fact that the density value has a simple relationship with the ink layer thickness. The densitometers used today have a very high resolution rate over time. That is to say, it is possible for a large number of measured values to be obtained on a measurement field of given size.

For the analysis of measurement fields lined up with one another to form color measurement strips, measuring systems move in one or two directions, usually by way of a measuring head (densitometer, spectrophotometer) that moves in the X-Y plane. For this purpose, the measuring head is movably suspended on a bridge that spans the printed product. Part of the bridge may move with respect to the substrate supporting the printed product. The measuring head can be moved relative to the bridge, and the bridge can be moved relative to the substrate. Associated actuating motors provide the drive source.

By means of a measuring system of this type, it is possible for several measurement strips distributed over a printed sheet or individual measurement fields to be scanned section by section. The measurement sequence is programmed in advance and then executing under automatic control during the actual monitoring of the printed products.

The many advantages of densitometry for printing control are countered by the fact that the ink density values cannot be converted to calorimetric values or compared with calorimetric values without making certain assumptions. The reason for this is that colorimetry is based on filters that are adapted from the human color sensation (i.e., X-, Y-, Z- standard spectral value curves). In order to measure calorimetric values, that is to say color loci, it is necessary to expand a densitometer (with three or four channels) to include a color measuring system. The coloring measuring system may be designed as a tristimulus measuring instrument or spectral measuring system. It is also possible to design the measuring system as a spectral measuring head or spectrophotometer, wherein the weighting of the received reflectances are carried out purely by computation—i.e., the registered spectra are weighted by predefined filtering functions.

However, the integration or computation times for weighting the reflected spectra detected by such spectrophotometers are several times greater than those of known densitometers. Thus, fewer spectra data are received per unit time with respect to density data, and there are also fewer data available for further analytical purposes. This disadvantage is serious if such a measuring system of spectrophotometric design is used in a so-called scanning measuring system, in which the measuring head is moved relative to the measurement fields of the measuring strip.

In order to minimize the space needed on the printed material by a measurement strip, the measurement fields are provided with the smallest possible dimensions. For a typical traveling speed of the measuring head relative to the printed material and the measurement field thereon, there is only a short time available for measurement. In the case of the long integration or computation times of a measuring system with a spectrophototmeter and the resulting low sampling rate, there are only a few samplings of the spectra data available per measurement field.

A further disadvantage of a measuring head that employs a spectrophototmeter are the polarization filters needed by the densitometer to eliminate gloss effects induced by fresh ink, which cannot be used by the spectrophotometer for ascertaining color loci. A spectrophotometric measuring instrument which, from the reflectance values, permits both ink density and calorimetric measured values to be obtained by calculation, is already known, for example as descried in U.S. Pat. No. 5,182,721 (EP 0 228 347).

A combined measuring head, comprising a densitometer for obtaining ink density data and a tristimulus measuring head for measuring calorimetric values, is described in U.S. Pat. No. 5,141,323 (DE 3 830 731 A1). This patent also discloses fitting such a combined measuring head to a measuring system that can be moved relative to the printed product. The disadvantage of this approach, however, is that the tristimulus measuring heads are miniaturized, which results in their not satisfying the requirements for accurate measurement. Furthermore, in the case of a tristimulus measuring head, different illumination conditions and assessment functions can be realized only with a relatively high outlay, which also is contrary to miniaturization.

German Patent No. DE 195 30 185 C2 discloses a spectral measuring head alongside an ink density measuring head of integral construction. In this construction, separate optical channels are used for obtaining spectral reflectances and ink density measured values. The disadvantage to this approach, however, is that, as already indicated above, the integration or computation times are very different for obtaining the values of the ink density the spectral reflectance.

Also, in order to obtain calorimetric measured values by means of the spectral measuring system, the measuring head must be adjusted relatively precisely to the measurement field to be measured, which makes an automated method more difficult. Precise adjustment of the measuring head is necessary in order to correctly measure the measuring fields. Faulty measured values may occur when a measurement is made at a boundary of a measurement field. In this situation, a color is ascertained that corresponds to a mixture of the colors of the measurement field and the printed material or a mixture between the colors of two adjacent measurement fields. These boundary measurements may be detected by evaluating the course of measured values for the ink density obtained shortly beforehand, and thus avoided by calculating the correct measuring position.

The prior art discloses numerous solutions in order, using movable densitometers, to establish both the boundaries of the measurement fields and the location and orientation of a color measurement strips on the printed material. For example, a movable densitometer is known in which the printed sheet with the measurement strip located on it is first placed along a support rail. Then the densitometer carries out a search run perpendicular to the edge of the sheet (i.e., the Y direction), which is transverse to the direction in which the measurement strip extends (i.e., the X direction). This search run in the Y direction determines the distance of the measurement strip from the edge of the printed material. Following the search run, a scanning operation is performed by densitometer by its movement in the X direction (direction of the measurement strip).

It is also known to provide a movable densitometer with a seeking optical unit that comprises a projection device, by means of which two light spots are projected onto the printed material in front of the densitometer in the scanning direction. These light spots having a spacing which is less than the width (X direction) of the measurement fields to be measured. If a densitometer that is equipped with a seeking optical unit moves along the center of the measurement strip to be measured, then the two light spots projected by the optical unit is are both incident on the field to be measured and, thus the reflected light from the two spots is the same. The similarity of the reflected light can be established by means of associated detectors. If the densitometer comes off track, then one of the light spots will move onto an unprinted area of the printed material, whereas the other light spot still reflects the color of the measurement field. In this situation, the different reflectance values determine in which direction the densitometer must be moved in order to correct its position so that it follows along the center of the measurement strip.

Furthermore, during a measurement run of densitometers that operate with high local resolutions, the accumulating measured data are processed in order to establish the color and determine the boundaries or centers of the measurement fields. This determination is carried out by first analyzing the measured values of the ink density obtained from several channels, and then differentiating the values over the course of the measuring head traveling in the scanning direction. By sensing the measurement field boundaries in this way, the center of the measurement field may be precisely determined. Since this technique accumulates a large number of data accumulate for each measurement field, averaging achieves greater reliability of the measured values.

SUMMARY OF THE INVENTION

The object of the present invention is therefore to expand a measuring system to the extent that measuring devices supplying ink density and spectral, preferably calorimetric, measured values can be combined with one another without additional outlay in terms of construction, the combination of the two measuring principles to be provided being adapted optimally to the task of a measurement strip to be scanned in the longitudinal direction.

According to the invention, the scanning spot of the densitometer in a measuring head has a distance from the scanning spot of the spectrophotometer such that the densitometric values are used for analyzing the type, color and/or location of the measurement fields and for triggering the spectral measuring system. The densitometer is arranged in the scanning direction upstream of the measuring head, which is preferably provided with a spectrophotometer for collecting calorimetric data. The distance provided in the scanning direction (X direction) between the scanning spot of the densitometer and of the spectrophotometer is adapted to the scanning speed V of the measuring system in such a way that the evaluation electronics are able to evaluate the data in accordance with the prescribed algorithm.

According to one embodiment of the invention, the collection of measured values from the densitometer, which occur much more frequently then the calorimetric measurements (e.g., 40 times more frequently), are used for determining the location and the course of the boundaries of the measurement fields within the measurement strip, from which is determined the center of the measurement fields. In order to determine the boundaries of the measurement field, as well as the center of the field, known evaluation algorithms are used, such as those described in European Patent No. 0 370 126 B1. In order to determine the boundaries of the measurement field, the ink density values are registered as a function of the scanning direction (X direction) and subjected to a two-fold differentiation to find the second derivative with respect to location. From the number of measured values which do not change within a predefined tolerance range it is also possible to determine the measurement field size and hence also the center of the field. The center of a measurement field determined in this way can then be used, taking into account the scanning speed V and the distance between the scanning spots of the densitometer and of the spectral measuring system, for generating a triggering time for triggering measurement of the spectrophotometer (color measurement).

According to the embodiment of the invention outlined, the measured values (C-, M-, Y-, K-) of the ink density that accumulate from the channels may be used for identifying the calorimetric characteristics of the measurement fields within the measurement strip. Here, too, known identification methods may be used, according to which the type and the structure of the measurement strip is determined on the basis of the ink density measured values. An example of a suitable method can be found in the above-mentioned European Patent No. 0 370 126 B1. This identification makes it possible to trigger the time-consuming spectrophotometric measurement only on those measurement fields provided for color measurement.

According to the preferred embodiment of the invention, the measuring system, comprising densitometer and spectrophotometer, is expanded to include a conventional track-seeking optical unit, by means of which the measuring head of the invention is guided perpendicular (Y direction) to the direction in which the measurement strip extends (Y direction). The track-seeking optical unit preferably projects two points of light lying alongside each other onto the measurement fields. Using the differences in the reflections from these two points of light, correction movements in the Y direction (perpendicular to the direction in which the measurement strip extends) are generated if necessary.

The optical unit can be a conventional unit such as the one described in U.S. Pat. No. 4,806,002.

BRIEF DESCRIPTION OF THE DRAWINGS

The following is an explanation of two exemplary embodiments of the invention, with reference to the drawings, in which.

While the invention will be described in connection with certain preferred embodiments, it will be understood that it is not intended to limit the invention to these particular embodiments. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
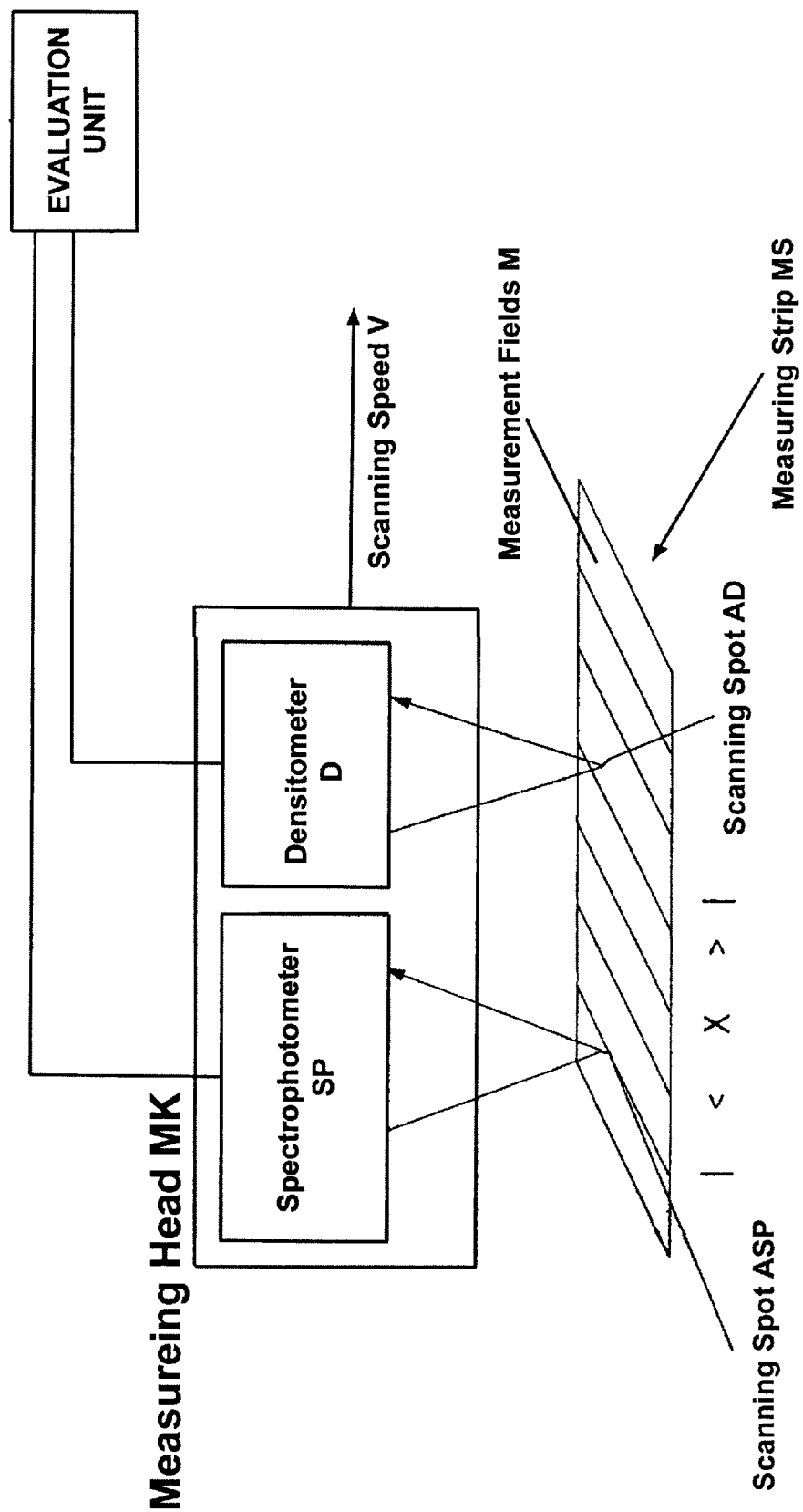
FIG. 1 shows the arrangement of a densitometer with a spectrophotometer arranged downstream according to a first embodiment of the invention.

Referring first to FIG. 1, the measuring system of the invention comprises a measuring head MK that in turn comprises a densitometer D, downstream of which in the scanning direction X (scan direction of the measuring system) there is arranged a spectrophotometer SP. Both the densitometer D and the spectrophotometer SP are of conventional design. An example of a measuring head having a suitable densitometer and spectrophotometer is identified above in the "SUMMARY" section. The measuring head MK is used to scan measurement fields M of a measurement strip MS.

The scanning spot AD of the optics of the densitometer D and the spot ASP of the spectrophotometer SP are separated from each other by a predefined distance x in the scan direction of the measuring system. The measured signals from the densitometer D and the spectrophotometer SP are fed to evaluation electronics AE, the signals from the densitometer D being analyzed there in the manner outlined above in the "SUMMARY" section. In particular, the measured values of the ink density from the densitometer D are analyzed in order to determine the type of the measurement field, the color of the measurement field and its boundaries.

The distance x between the scanning spot AD of the densitometer D and the scanning spot ASP of the spectrophotometer SP is determined as a function of the scanning speed V of the measuring head MK and the time required by the evaluation electronics to perform its operations for carrying out a measurement by the spectrophotometer SP at a location within a measurement field M of the measurement strip MS.

Figure 2:
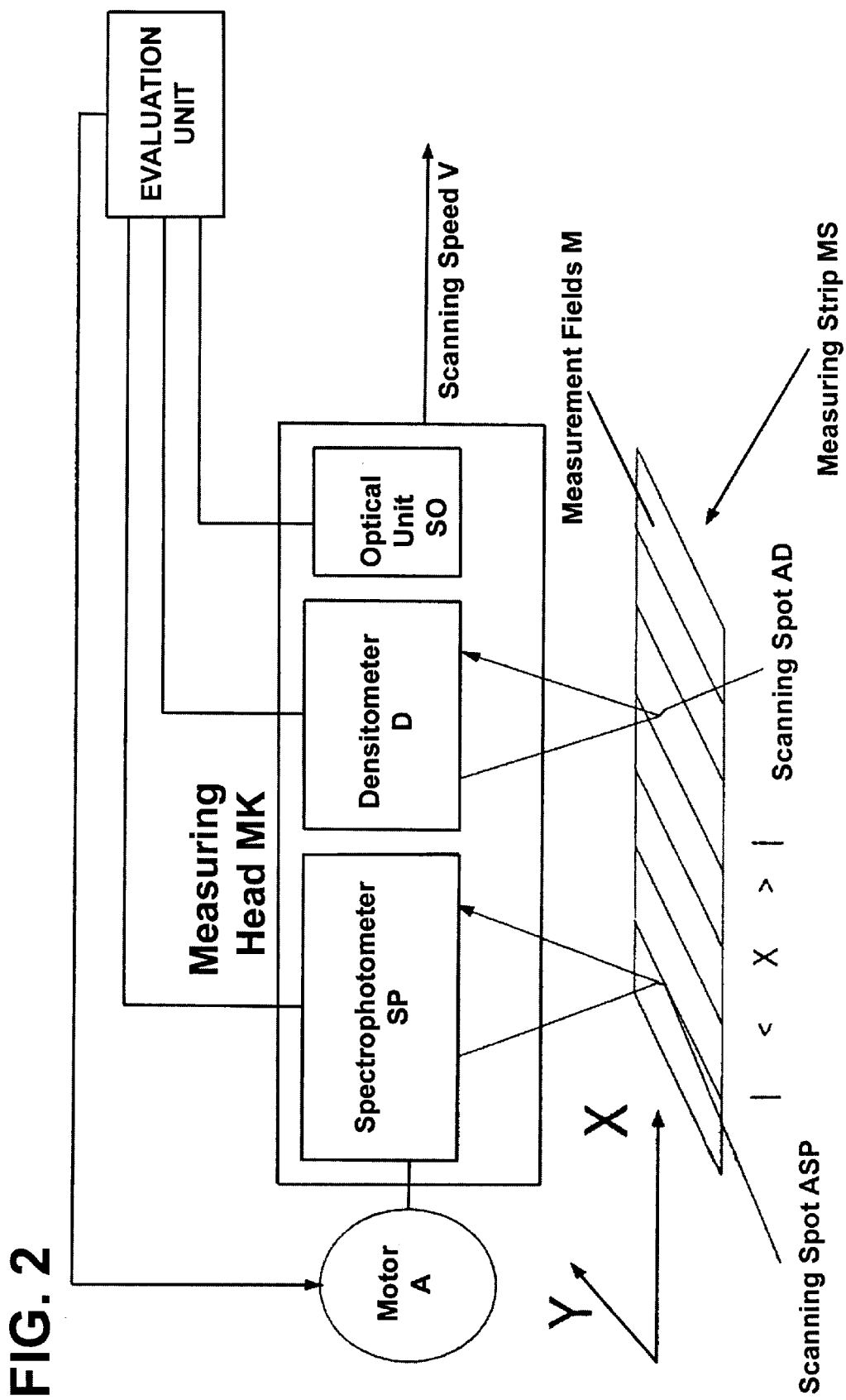
FIG. 2 shows the arrangement according to FIG. 1, expanded by a track-seeking optical unit, for generating correction movements in the Y direction according to a second embodiment of the invention.

FIG. 2 shows a preferred development of the measuring system according to the invention, comprising the densitometer D and the spectrophotometer SP. As in the embodiment according to FIG. 1, the scanning spots AD, ASP of the densitometer D and of the spectrophotometer SP are separated from each other by the predefined distance x in the X direction (scan direction). In this case there is arranged upstream of the densitometer D and a track-seeking optical unit SO. The track-seeking optical unit SO provides additional information to the evaluation electronics about the location of the measuring system in the Y direction (direction perpendicular to the scan direction of the measuring system). The measuring head MK of FIG. 2 can be moved by an associated drive A both in the X direction (scan direction) and in the Y direction. For this purpose, the measuring system is preferably suspended so as to be movable in the two directions on a bridge (not shown) that spans the printed sheets or the printed product.

As shown in FIG. 2, signals from the track-seeking optical unit SO, which, like the signals from the densitometer D and the spectrophotometer SP in FIG. 1, are fed to the evaluation electronics AE, where the position of the measuring head MK is determined and tracked. From this tracking information, the evaluation electronics provides drive signals to the drive A of the measuring system, which drives the measuring head MK in the Y direction in order to carry out correction movements.

Figure 3:
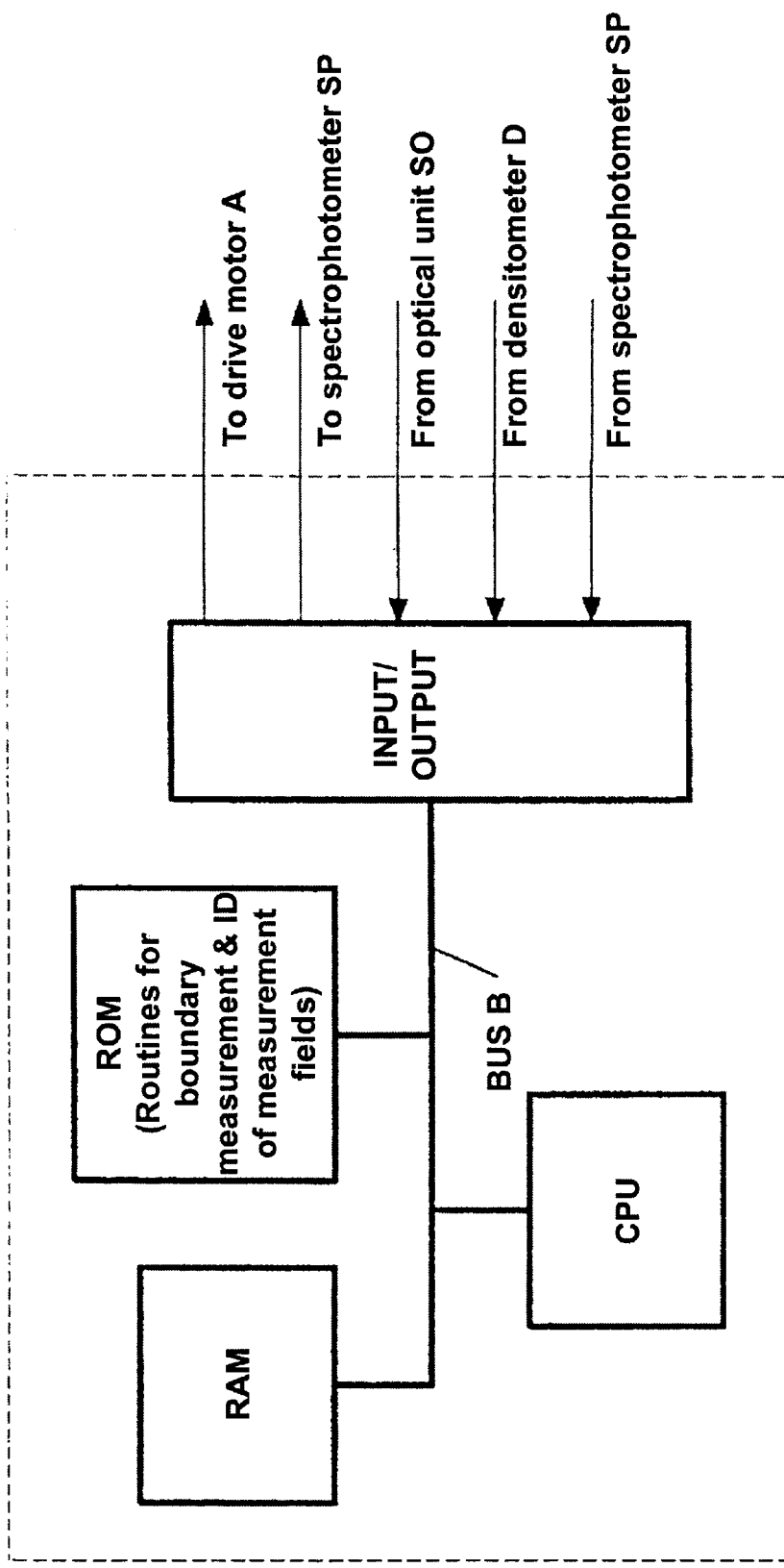
FIG. 3 shows the conventional von Neumann architecture of the electronics that evaluates the data from the densitometer and the spectrophotometer for controlling the positioning of the measuring head and the triggering of the spectrophotometer in accordance with the invention.

As illustrated in FIG. 3, the architecture of the evaluation electronics AE is a conventional von Neumann architecture based on a commercially available central processing unit CPU. In keeping with the von Neumann architecture, the CPU is in communication with a RAM and ROM by way of a bus B. The CPU communications with the densitometer D and the spectrophotometer SP by way of a conventional input/output device I/O in FIG. 3, such as a UART.

In keeping with the invention, the ROM in FIG. 3 includes program modules that are executed by the CPU of the evaluation electronics in order to determine the boundaries of the measurement fields, which are then used to control the drive A to keep the spots AD and ASP centered on the field. Other program modules in the ROM identify the calorimetric characteristics of the field from the density values and use the characteristics to control the triggering of the spectrophotometer, which is otherwise controlled by the timing derived from the velocity of the measuring head MK and the distance x between the spots AD and ASP.

Figure 4:
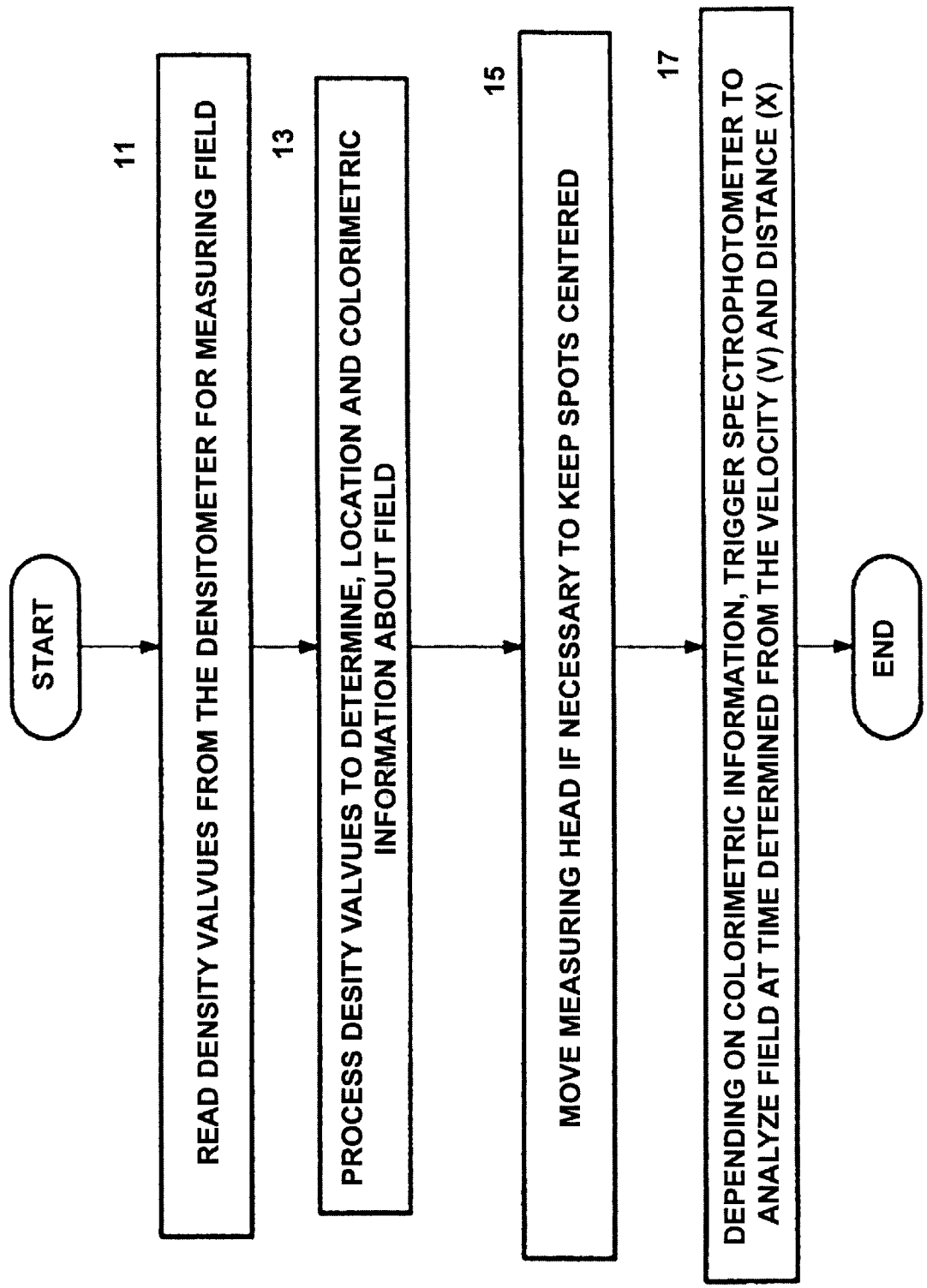
FIG. 4 shows a flow diagram for the program modules executed by the electronics of FIG. 3 in keeping with the invention.

A representative flow diagram of the steps executed by the CPU is illustrated in FIG. 4. In step 11, the CPU under program control reads the values of the density of a given field as measured by the densitometer. In step 13, the density values are processed by the CPU to determine the location of the spot AD and derive certain calorimetric information about the field. Inn step 15, the CPU determines whether the spot AD is off-center and provides a drive signal to the drive motor A if the spot is off center, which will then move the measuring head MK so that the spot ASP will be properly centered for the for its later measurement of the field. In step 17, the CPU under program control determines whether the measurement field is of a type that requires color measurement. If it is not, then the CPU does not trigger the spectrophotometer to collect spectra data for that field, thereby avoiding unnecessary calculations by the CPU.

It will now be apparent that what has been provided herein is an improved measuring system for measuring the calorimetric values of the measuring fields in a measuring strip of a printed material such as a sheet. The invention improves the tracking of the spot ASP of the spectrophotometer and synchronizes the timing of the color measurements derived from the spectra of the reflections from the spot with those of the densitometer in order to provide the most accurate measurements.

All the references cited herein, including all of the U.S., European and German patents, are hereby incorporated herein by reference.

We claim:

1. A measuring system for registering reflectances from a measurement field on printed material, the measuring system comprising: a measuring head having a (1) densitometer with at least one illumination channel for producing a scanning spot at a point and a plurality of scanning channels for registering the reflectances of the spot, the scanning channels registering ink density values and calorimetric values (2) and a spectrophotometer that produces a further scanning spot on the printed material, the densitometer and the spectrophotometer mounted in the head one behind the other such that their scanning spots are spaced apart from each other by a distance (x) in a scanning direction (X) of the measuring head; an evaluation electronics connected downstream of the densitometer and the spectrophotometer for processing the measured values collected by the densitometer and in response thereto triggering the spectrophotometer.

2. The measuring system according to claim 1, wherein the distance (x) between the scanning spot of the densitometer and the scanning spot of the spectrophotometer in the scanning direction (X) is selected as a function of the scanning speed (v) of the measuring system and the processing speed of the evaluation electronics.

3. The measuring system according to claim 1, wherein the measurement fields of a measurement strip running in the scanning direction (X) are scanned by the densitometer and the spectrophotometer and the evaluation electronics processes the ink density values from the densitometer to form measurement times for the spectrophotometer.

4. The measuring system according to claim 2, wherein the measurement fields of a measurement strip running in the scanning direction (X) are scanned by the densitometer and the spectrophotometer, and the evaluation electronics processes the ink density values from the densitometer to form measurement times for the spectrophotometer.

5. Measuring system according to claim 3, wherein upstream of the densitometer and the spectrophotometer there is mounted in the measuring head a track-seeking optical unit, which provides information to the evaluation electronics describing the lateral alignment of the measuring head over measuring strips.

* * * * *